March 2, 1965
W. A. LEDWITH
3,171,248
THRUST CUT-OFF METHOD
Filed Feb. 4, 1963
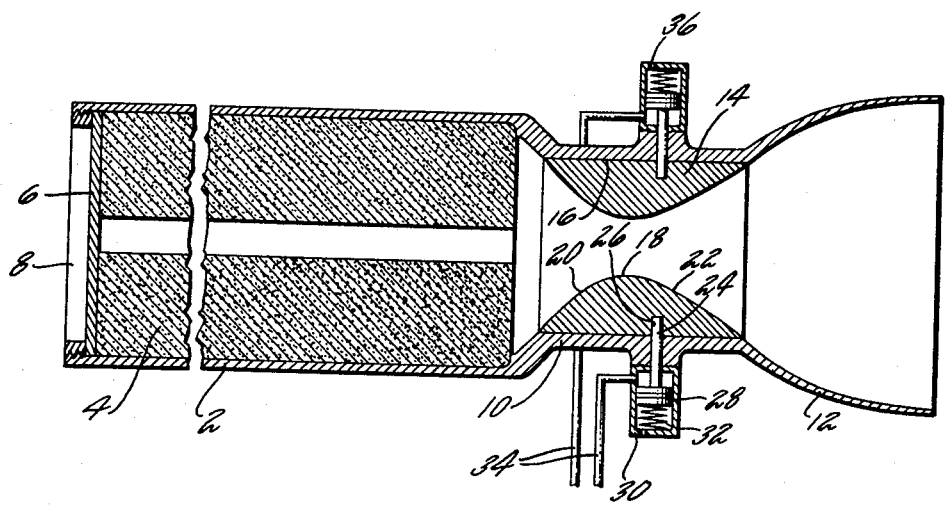
INVENTOR
WALTER A. LEDWITH
BY Vernon F. Hauschild
ATTORNEY

United States Patent Office 3,171,248
Patented Mar. 2, 1965

3,171,248
THRUST CUT-OFF METHOD
Walter A. Ledwith, Lake Park, Fla., assignor to United Aircraft Corporation, East Hartford, Conn., a corporation of Delaware
Filed Feb. 4, 1963, Ser. No. 255,818
3 Claims. (Cl. 60—35.3)

This is a continuation-in-part application of U.S. application Serial No. 300, filed on January 4, 1960, now abandoned, for improvements in Thrust Cut-Off Means, by Walter A. Ledwith.

This invention relates to a rocket nozzle construction for solid rockets and particularly to an arrangement for cutting off the rocket thrust at a selected point in the rocket operation.

One feature of the invention is an arrangement for ejecting the nozzle throat at any selected point in the rocket operation thereby materially reducing the rocket thrust.

In some types of rockets, specifically solid fuel rockets, the rate of combustion within the chamber varies with the pressure therein and combustion will not continue below a selected pressure. One feature of this invention is an arrangement for ejecting the nozzle throat thereby reducing the pressure within the combustion chamber either to slow down the rate of combustion or to stop further combustion. Another feature is an arrangement by which to lock the nozzle throat in position and to release the throat at a selected point during the rocket operation.

Other features and advantages will be apparent from the specification and claims, and from the accompanying drawing which illustrates an embodiment of the invention.

The single figure is a longitudinal cross-sectional view through the rocket.

Referring particularly to the drawing, the rocket includes a combustion chamber 2 in which a fuel 4 is burned. In the construction shown, the fuel is a solid fuel which is positioned within the chamber and which provides both the fuel and the oxidant for the support of combustion within the chamber. The head 6 of the rocket may be removable and held in position as by a clamping ring 8 thereby permitting insertion of the solid fuel.

The end of the chamber 4 remote from the head 6 has a cylindrical portion 10 preferably of somewhat smaller diameter of the chamber and, downstream of the cylindrical portion 10, a divergent wall portion 12 forming the discharge end of the nozzle. Within the cylindrical portion 10 is positioned a nozzle throat in the form of an annulus 14 having a cylindrical outer surface 16 fitting within the cylindrical portion 10 and having a central passage 18 which is convergent as at 20 and then divergent as at 22 to define the nozzle throat. The annulus 14 may be made of a heat resistant material such as a ceramic in order to withstand the heat of the gas through the throat.

The annulus 14 is held in place by radial pins 24 fitting in recesses 26 in the annulus. Each pin 24 carries at its outer end a piston 28 fitting within a cylinder 30 supported on the periphery of the cylindrical portion 10. A spring 32 normally urges the pin 24 into the operative position shown.

For the purposes of releasing the annulus 14 or nozzle throat, the pins 24 may be retracted by admitting fluid under pressure through conduits 34 to the inner ends of the cylinders 30. This fluid pressure will withdraw the pins 24 from the annulus and the pressure within the combustion chamber will then blow the annulus out of the cylindrical portion 10. The outer end of each cylinder 30 may be vented as shown at 36.

In operation, combustion is initiated by any suitable ignitor and will continue at the appropriate rate since the restriction at the nozzle throat is sufficient to maintain within the combustion chamber a pressure high enough to assure the desired rate of combustion. When the rocket or the vehicle to which the rocket is attached has reached its desired velocity and requires no further propulsion, the rate of combustion may be substantially reduced or discontinued by releasing the nozzle throat or annulus 14. As above stated, the nozzle throat will be blown out of the rocket due to the pressure created by the combustion of the solid propellant 4 within rocket combustion chamber 2 and the larger discharge opening then provided causes a substantial drop in pressure within the combustion chamber thereby either materially reducing the combustion rate or discontinuing the combustion completely.

As explained on pages 325 and 326 of the second edition of Sutton entitled, "Rocket Propulsion Elements," and published by Wiley, it will be noted that there is a practical upper and lower pressure limit for the satisfactory operation of a solid propellant. It is important to select the area of exhaust nozzles throat 18 such that, for the particular solid propellant chosen, proper thrust generation will be obtained during the required part of the operation of the rocket. It is also important to select the area of cylindrical portion 16 of the exhaust nozzle such that, with plug 14 jettisoned, the pressure within combustion chamber 2 will be below the lower combustion limit of the paritcular solid propellant being used. As explained on pages 325 and 326 the aforementioned Sutton publication, there is a practical upper and lower pressure limit for the satisfactory operation of each solid propellant. As illustrated on pages 312 and 313 of Sutton, and in particular in table 9–1 thereof, it will be noted that the lower combustion limits for typical solid propellants are given. For example, when potassium perchlorate ($KClO_4$) is used as the solid propellant oxidizer with a very general solid propellant fuel whose percent composition is $C_2H_4O$, the lower combustion limit is 200 to 1000 p.s.i. When ammonium perchlorate ($NH_4ClO_4$) is used as the solid propellant oxidizer with the aforementioned fuel, the lower combustion limit is 200 p.s.i. Again, when ammonium nitrate ($NH_4NO_3$) is used as the solid propellant oxidizer with the aforementioned fuel, the lower combustion limit reduces to 100 p.s.i. Commercially available solid propellant of the rubber base-ammonium perchlorate type is known as Thiokol T17E2. Rocketdyne RDS–184 is an available solid propellant using ammonium nitrate as the oxidizer in significant percentages.

Although the structure is described for use with a solid rocket it will be apparent that the device may be applicable in certain instances to liquid fuel rockets since the removal of the nozzle throat in the operation of liquid fuel rockets will result in a substantial reduction in thrust by reason of the increased discharge area for the combustion chamber.

It is to be understood that the invention is not limited to the specific embodiment herein illustrated and described, but may be used in other ways without departure from its spirit as defined by the following claims.

I claim:
1. The method of terminating thrust in a solid propellant rocket comprising generating pressurized products of solid propellant combustion, then discharging the products to atmosphere through a restricted nozzle to generate thrust, then increasing the area of the nozzle restriction to reduce the generated pressure below the lower combustion limit of the propellant.

2. The method of terminating thrust in a solid propellant rocket comprising generating pressurized products of solid propellant combustion, then discharging the products to atmosphere through a restricted nozzle to generate thrust, then utilizing the pressure generated by said solid propellant rockets to increase the area of the nozzle restriction to reduce the generated pressure below the lower combustion limit of the propellant.

3. The method of terminating thrust in a solid propellant rocket comprising generating pressurized products of solid propellant combustion, then discharging the products to atmosphere through a restricted nozzle to generate thrust, then utilizing said pressurized products to jettison a restriction in said restricted nozzle to increase the area of the nozzle to thereby reduce the generated pressure below the lower combustion limit of the propellant.

References Cited by the Examiner
UNITED STATES PATENTS

| | | | |
|---|---|---|---|
| 2,670,596 | 3/54 | Whitworth | 60—39.1 |
| 2,850,976 | 9/58 | Seifert | 60—35.6 |
| 3,038,303 | 6/62 | Gose | 60—35.6 |

SAMUEL LEVINE, *Primary Examiner.*